M. SUBBER.
ADJUSTABLE BEARING.
APPLICATION FILED MAY 25, 1909.
967,853.
Patented Aug. 16, 1910.
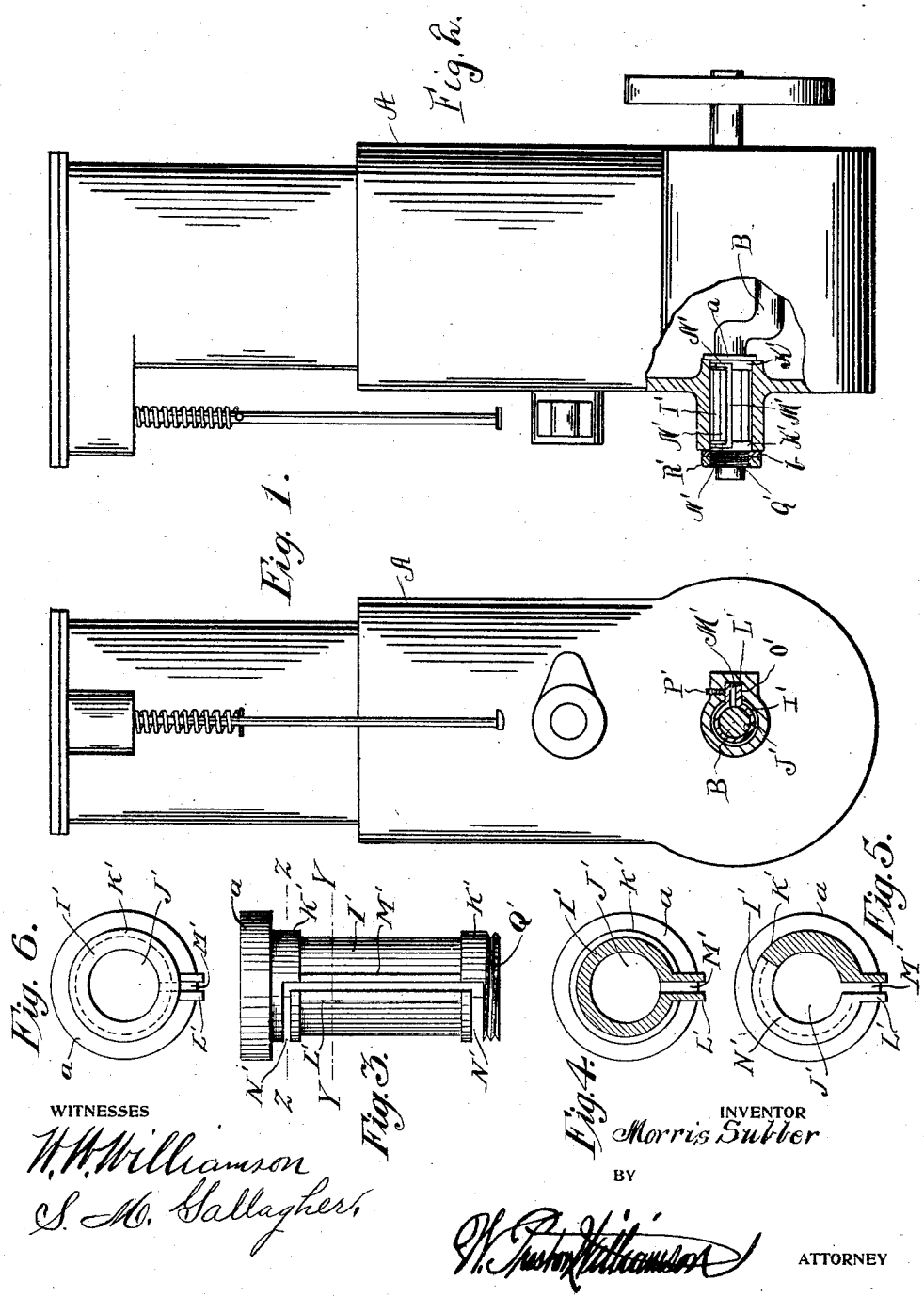
WITNESSES
W. W. Williamson
S. M. Gallagher
INVENTOR
Morris Subber
BY
W. Truston Williamson
ATTORNEY

UNITED STATES PATENT OFFICE.

MORRIS SUBBER, OF WOODBINE, NEW JERSEY.

ADJUSTABLE BEARING.

967,853.   Specification of Letters Patent.   Patented Aug. 16, 1910.

Application filed May 25, 1909. Serial No. 498,262.

*To all whom it may concern:*

Be it known that I, MORRIS SUBBER, a citizen of the United States, residing at Woodbine, in the county of Cape May and State of New Jersey, have invented a certain new and useful Improvement in Adjustable Bearings, of which the following is a specification.

My invention relates to a new and useful improvement in adjustable bearings, and has for its object to provide an exceedingly simple and effective device of this character which will form an air and oil tight closure for the opening in the cylinder base, through which passes the crank shaft, at the same time providing a take-up for the wear in crank shafts of engines.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a front elevation of an engine showing my improved bearing in position, said bearing and a portion of the engine being shown in section. Fig. 2, a side elevation thereof having a portion broken away to show the adjustable bearing. Fig. 3, a side elevation of the adjustable bearing. Fig. 4, a section at the line $y$—$y$ of Fig. 3. Fig. 5, a section at the line $z$—$z$ of Fig. 3. Fig. 6, an end view of the adjustable bearing.

In carrying out my invention as here embodied, A represents the cylinder of an engine provided with a crank shaft B, which passes through the lower portion thereof.

I' represents the bearing having a circular opening J' in which revolves the crank shaft B, and enlarged portions K' adapted to rest in the casing of the cylinder. Formed with said bearing is a key L' having a slot M' formed therein, from the ends of which run the parallel slots N', a little more than half way around the bearing. With the inner end of the bearing is formed the flange $a$ which rests firmly against the inner surface of the engine casing. When the bearing is placed in the engine the key L' engages with the keyway O' in the casing and through this casing passes a screw P', the inner end of which rests against the upper portion of the key L'. Should the crank shaft B become loose in the bearing, the screw P' may be threaded downward which will draw the bearing tighter about said crank shaft thus taking up the lost motion. The outer end of the bearing is provided with a thread Q' adapted to receive the nut R', a packing ring $b$ having first been placed on the outer end of the bearing adapted to rest between the nut and casing, which will hold said bearing in place, and if found desirable a packing may be placed between the flange $a$ and the engine casing, thus forming an air and oil tight closure for the opening, through which the crank shaft passes.

Having thus fully described my invention, what I claim as new and useful, is—

1. A bearing provided with a split key and having enlarged portions, one of said enlarged portions having a thread cut thereon, said enlarged portions having slots cut therein running from the ends of the split key a little more than half way around the bearing.

2. The combination with the bearing box of an engine, of an adjustable bearing having enlarged portions at both ends thereof, one of said enlarged portions having a thread thereon, a key formed integral with said bearing, having a slot therein, said bearing also having other slots running from the ends of the first named slot approximately half way around the bearing, a nut threaded on the outer end of the bearing, and a screw passing through a portion of the engine, the lower end thereof engaging the key whereby the bearing may be adjusted.

In testimony whereof, I have hereunto affixed my signature in the presence of two subscribing witnesses.

MORRIS SUBBER.

Witnesses:
EDW. W. AUSTIN,
S. M. GALLAGHER.